(12) United States Patent
Danton et al.

(10) Patent No.: US 8,001,155 B2
(45) Date of Patent: Aug. 16, 2011

(54) HIERARCHICALLY PRESENTING TABULAR DATA

(75) Inventors: Stephen M. Danton, Seattle, WA (US); Yuri Rychikhin, Seattle, WA (US); Scott Roberts, Bothell, WA (US); Michael C. Murray, Seattle, WA (US); Florian Voss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 12/143,273

(22) Filed: Jun. 20, 2008

(65) Prior Publication Data

US 2009/0319543 A1  Dec. 24, 2009

(51) Int. Cl.
G06F 7/00 (2006.01)
G06F 17/24 (2006.01)
(52) U.S. Cl. ........ 707/798; 707/792; 707/797; 715/212; 715/227; 715/270; 715/713; 715/763
(58) Field of Classification Search ............... 707/792, 707/798, 797; 715/212, 227, 270, 713, 763
See application file for complete search history.

(56) References Cited

U.S. PATENT DOCUMENTS

| | | |
|---|---|---|
| 5,974,407 A | 10/1999 | Sacks |
| 6,205,453 B1 | 3/2001 | Tucker et al. |
| 6,765,597 B2 | 7/2004 | Barksdale et al. |
| 6,990,638 B2 | 1/2006 | Barksdale et al. |
| 7,143,339 B2 | 11/2006 | Weinberg et al. |
| 7,299,410 B2 | 11/2007 | Kays et al. |
| 7,305,408 B2 | 12/2007 | Morris |
| 2003/0234816 A1 | 12/2003 | Rosen et al. |
| 2005/0076312 A1 | 4/2005 | Gardner |
| 2006/0101324 A1 | 5/2006 | Goldberg et al. |
| 2006/0117253 A1* | 6/2006 | Polash .................. 715/517 |
| 2006/0174189 A1 | 8/2006 | Weitzman |
| 2007/0150485 A1 | 6/2007 | Uittenbogaard |
| 2008/0282189 A1* | 11/2008 | Hofmann et al. .......... 715/793 |
| 2009/0292718 A1* | 11/2009 | Cuneo et al. .............. 707/101 |

OTHER PUBLICATIONS

Bookshelf v7.7"How hierarchical List Applets are rendered", Sep. 2004.*
Softpedia, "dhtmlxTreeGrid 1.6", Developer Scand LLC, May 2008, 2 pages.
Altova, "XMLSpy: Grid View", 2008, 3 pages.
Georeference Online Ltd, "TreeList Editor", May 2007, 2 pages.
Esposito, Dino, "Nested Grids for Hierarchical Data", 2008, 13 pages.

* cited by examiner

Primary Examiner — Apu M Mofiz
Assistant Examiner — Cindy Nguyen
(74) Attorney, Agent, or Firm — Workman Nydegger

(57) ABSTRACT

The present invention extends to methods, systems, and computer program products for hierarchically presenting tabular data. Embodiments of the invention utilize out-denting and/or color coding to organize and present tabular data to a user so that comparisons across multiple levels of data are possible while maintaining hierarchical organization of a model. That is, the columnar structure of tables can be maintained to allow rich cross-column comparison within various levels of nesting. Further, scaling is significantly increased since nesting has a reduced (and potentially no) impact on column alignment.

20 Claims, 11 Drawing Sheets

| Filename | Date | Owner | Type |
|---|---|---|---|
| ▲ Annual Report | 1/22/2008 | JSmith | Folder |
| ▲ Family Vacation | 5/7/2007 | SSmith | Folder |
| ▲ Marketing Breakdown | 2/12/2008 | JSmith | Folder |

Table 600

Cursor 691

Row 601 (Cyan)
Row 602 (White)
Row 603 (Red)

FIG. 6B

| Filename | Date | Owner | Type |
|---|---|---|---|
| ▲ Annual Report | 1/22/2008 | JSmith | Folder |
| ▲ Sales Figures | 1/22/2008 | SJohnson | Excel |
| ▲ Overview | 5/7/2007 | MJackson | Ppt |
| ▲ Family Vacation | 5/7/2007 | SSmith | Folder |
| ▲ Marketing Breakdown | 2/12/2008 | JSmith | Folder |

Table 600

Row 601 (Cyan)
Row 611 (Peach)
Row 612 (Magenta)
Row 602 (White)
Row 603 (Red)

Table 700

| Name | Type | Owner | Date Modified | |
|---|---|---|---|---|
| Par70670 | Some Content | Some Content | Some Content | Row 701 |
| Chld152238 | Some Content | Some Content | Some Content | Row 702 |
| Chld152238 | Some Content | Some Content | Some Content | Row 703 |
| Chld152238 | Some Content | Some Content | Some Content | Row 704 |

Properties — Embedded View 714

| Foo | Value | Foo | Value |
|---|---|---|---|
| Blork | TextBlock | Blork | TextBlock |
| Splatpow | Value | Splatpow | Value |
| Booyah | Value | Booyah | Value |
| | | Yoo | Value |
| | | Superprop | Value |
| | | Magma | Value |
| | | Xiogio | Value |

| Chld152238 | Some Content | Some Content | Some Content | Row 705 |
|---|---|---|---|---|
| Par152238 | Some Content | Some Content | Some Content | Row 706 |
| Chld106862 | Some Content | Some Content | Some Content | Row 707 |
| Chld106862 | Some Content | Some Content | Some Content | Row 708 |
| Par106862 | Some Content | Some Content | Some Content | Row 709 |
| Chld175443 | Some Content | Some Content | Some Content | Row 710 |

Properties — Embedded View 716

| Foo | Value | Foo | Value |
|---|---|---|---|
| Blork | TextBlock | Blork | TextBlock |
| Splatpow | Value | Splatpow | Value |
| Booyah | Value | Booyah | Value |
| | | Yoo | Value |
| | | Superprop | Value |
| | | Magma | Value |
| | | Xiogio | Value |

| Par175443 | Some Content | Some Content | Some Content | Row 711 |
|---|---|---|---|---|

HIERARCHICALLY PRESENTING TABULAR DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many business related processes are distributed across a number of different computer systems and/or a number of different computing components.

Electronic data is often stored in a tabular format such as, for example, in spreadsheets, databases, etc., including one or more rows of data. Each row stores data in one or more columns representing different values for the row. In some environments, a tabular format is used store to rows of data that are related to one another according to a defined data model.

For example, a tabular format can be used to store rows or data that are related to one another according to a hierarchical model. That is, data stored in one row can have a parent-child relationship with data stored on one or more other rows. However, the parent-child relationship is not necessary easily perceivable by a human that might view the tabular format. Thus, data stored in a tabular format is often presented in a manner that visually indicates the relationships between different rows of data. For example, for hierarchically modeled data, nested tables and indenting tree-tables are often used to indicate the hierarchical relationships between different rows stored in a tabular format.

Nested tables typically present tables within a table. Data in inner tables is visually indicated as child data to data in an outer table. However, nested tables do not scale well and can result in messy visualizations. For example, each level of nesting (as a by-product of being bounded within another table) has less space in which to represent a full row of data. Thus, there is some limit to the amount of nesting that can occur and have the interrelationships between rows still be reasonably perceivable by a human. Further, repeated nesting can cause columns to become unaligned due to less space for nested rows. Unaligned columns make it more difficult for users to compare like data elements from different rows.

Indenting tree-tables fix column alignment for all columns except a first (or left most) column of a table that typically includes a row identifier or name. Parent rows in the table are presented with a user-interface control (e.g., an expansion symbol) that when activated reveals corresponding child rows. When child rows are revealed, the identifier or name in the first column for each child row is indented somewhat (e.g., moved to the right) to indicate the relationship between the parent row and the child rows.

However, similar to nested tables, indenting tree-tables do not scale well. To compensate for indenting in response to revealing a child row, the width of first column is increased to insure that all identifiers or names can still be presented within the first column. Further indentions are used when expansion of a child row reveals further child rows. Thus, depending on number of intermediate relationships between a root row and leaf rows, the size of the first column can increase significantly when leaf rows are revealed. If the number of intermediate relationships is large, all of the columns of the table may not be visible simultaneously (e.g., a horizontal scroll bar may be required to scroll to the right).

BRIEF SUMMARY

The present invention extends to methods, systems, and computer program products for hierarchically presenting tabular data. In some embodiments, a computer system presents a hierarchical view of tabular data. The hierarchical view includes one or more expandable rows and one or more uniformly aligned columns. The one or more uniformly aligned columns include an identifier column for storing data that identifies a portion of tabular data.

Presentation of the hierarchical view of the tabular data includes presenting the one or more expandable rows. Each expandable row includes tabular data in one or more of the uniformly aligned columns, including at least in the identifier column. Each expandable row also includes an expansion symbol that can be selected to expand the view of the row to present any nested rows of tabular data corresponding to the selected row.

The computer system receives a user selection of an expansion symbol for a selected row from among the one or more presented expandable rows. In response, the computer system expands the table to reveal any nested rows corresponding to the selected row. Also in response, the computer system outdents presentation of the selected row and any revealed nested rows without resizing the width of the identifier column. Accordingly, out-denting provides a visual indication that the selected row was selected.

In other embodiments, either separately or in combination with other visualization techniques, rows are color coded to indicate relationships between rows. When presenting a hierarchical view with one or more expandable rows, each expandable row is presented using a first selected background color to color code the one or more expandable rows. In response to selection of an expansion symbol, nested rows are revealed. Any nested rows that are child rows (i.e., that do not include further nested rows) are presented using the first selected background color to color code the child rows. Any nested rows that are parent rows (i.e., that include further nested rows) are presented using a second different selected background color to color code the parent rows. Accordingly, further expandable parent rows are more easily distinguished visually from child rows.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 5A-5C illustrate an example table using color coding with out-denting to more easily distinguish rows from one another in hierarchically presented data.

FIGS. 6A-6B illustrate an example table using color coding with indenting to more easily distinguish rows from one another in hierarchically presented data.

FIG. 7 illustrates an example of a table including embedded rich views along with row views in a table.

FIG. 8 illustrates an example of a table including other embedded view combinations along with row views in a table.

DETAILED DESCRIPTION

Figure 1:
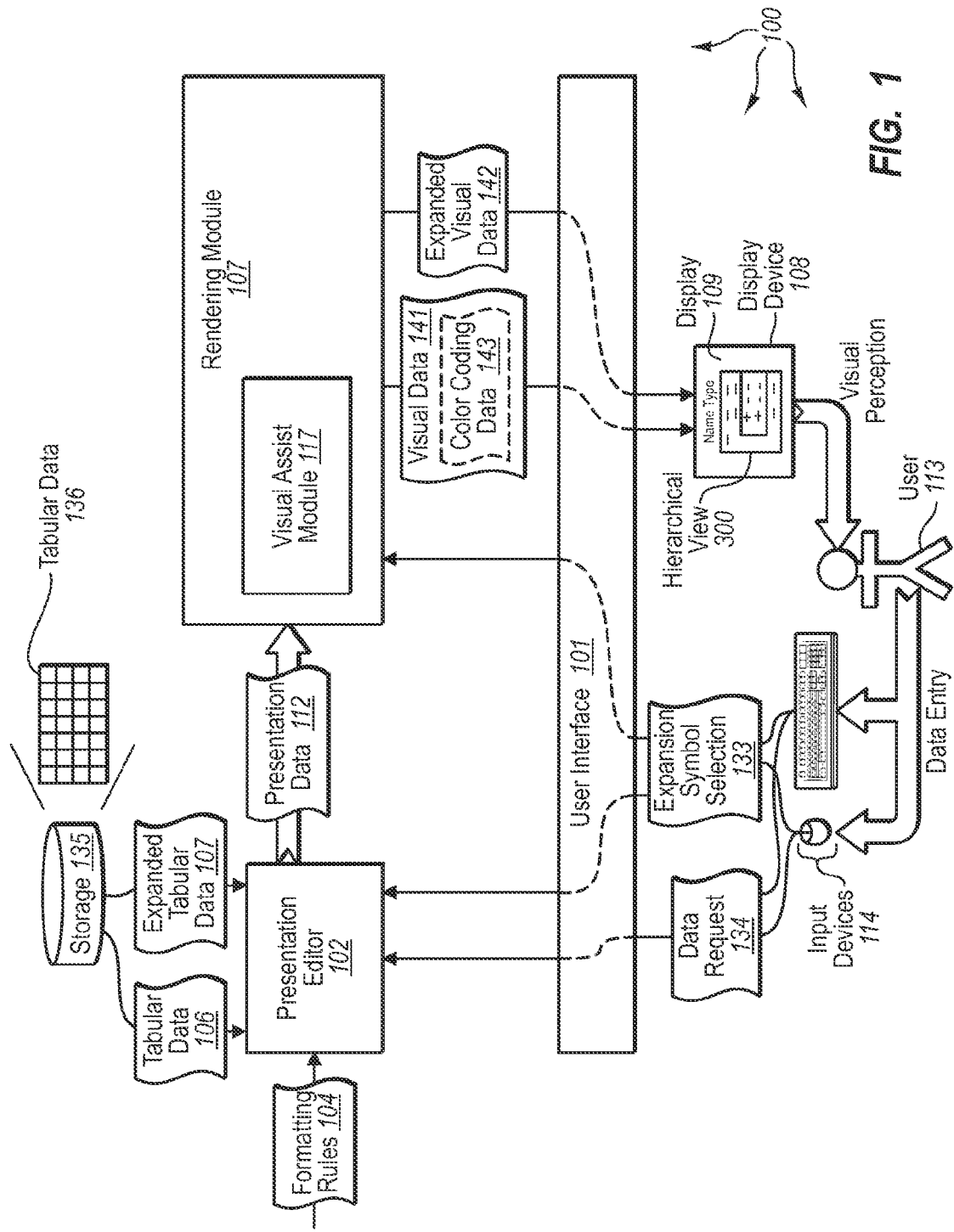
FIG. 1 illustrates an example computer architecture that facilitates hierarchically presenting tabular data.

The present invention extends to methods, systems, and computer program products for hierarchically presenting tabular data. In some embodiments, a computer system presents a hierarchical view of tabular data. The hierarchical view includes one or more expandable rows and one or more uniformly aligned columns. The one or more uniformly aligned columns include an identifier column for storing data that identifies a portion of tabular data.

Presentation of the hierarchical view of the tabular data includes presenting the one or more expandable rows. Each expandable row includes tabular data in one or more of the uniformly aligned columns, including at least in the identifier column. Each expandable row also includes an expansion symbol that can be selected to expand the view of the row to present any nested rows of tabular data corresponding to the selected row.

The computer system receives a user selection of an expansion symbol for a selected row from among the one or more presented expandable rows. In response, the computer system expands the table to reveal any nested rows corresponding to the selected row. Also in response, the computer system out-dents presentation of the selected row and any revealed nested rows without resizing the width of the identifier column. Accordingly, out-denting provides a visual indication that the selected row was selected.

In other embodiments, either separately or in combination with other visualization techniques, rows are color coded to indicate relationships between rows. When presenting a hierarchical view with one or more expandable rows, each expandable row is presented using a first selected background color to color code the one or more expandable rows. In response to selection of an expansion symbol, nested rows are revealed. Any nested rows that are child rows (i.e., that do not include further nested rows) are presented using the first selected background color to color code the child rows. Any nested rows that are parent rows (i.e., that include further nested rows) are presented using a second different selected background color to color code the parent rows. Accordingly, further expandable parent rows are more easily distinguished visually from child rows.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates hierarchically presenting tabular data. Referring to FIG. 1, computer architecture 100 includes user-interface 101, diagram editor 102, and rendering module 107. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Input devices 114 can include a variety of input devices, such as, for example, a keyboard and/or mouse. User 113 can utilize input devices 114 to enter data into computer architecture 100. Display device 108 can visually present data output from computer architecture 100 on display 109. User 113 can visually perceive data displayed at display 109.

Generally, user-interface 101 is configured to function as an intermediary software layer between user 113 and the other components of computer architecture 100. User-interface 101 can be configured with appropriate software, such as, for example, drivers, to receive input from input devices 114 and to send output to display device 108. Thus, user-interface 101 can forward user-input to other components, such as, for example, diagram editor 102. User-interface 101 can also forward renderable image data from other components, such as, for example, rendering module 107, to display device 108.

Presentation editor 102 is configured to access and hierarchically present tabular data, such as, for example, in tables or other data structures. In response to user-input, presentation editor 102 can access tabular data 106 from within tabular data 136 at storage 135. Presentation editor 102 can apply formatting rules 104 to tabular data 106 (e.g., for formatting tabular data 106 into a table) to generate presentation data 112. Presentation data 112 can include tabular data 106 as well as information for rendering tabular data 106 in a table or other data structure.

Rendering module 107 is configured to generate a table or other structure from presentation data 112. As depicted, rendering module 107 includes visual assist module 117. Visual assist module 117 is configured to provide visual cues to a user to assist the user in view the rows or a table or other structure. For example, upon user selection of a row within a table, visual assist module 117 can provide visual feedback indicating selection of the row. Visual feedback can include altering visual characteristics of elements and connections to indicate selection (e.g., graying out the outline of the row). Visual feedback can also include supplementing a diagram with additional visual information to assist a user in distinguishing between different portions of a table or other structure, such as, for example, out-denting and/or color coding.

FIGS. 3A-3D illustrate an example hierarchical view 300 using out-denting with hierarchically presented data to preserve column alignment.

Figure 2:
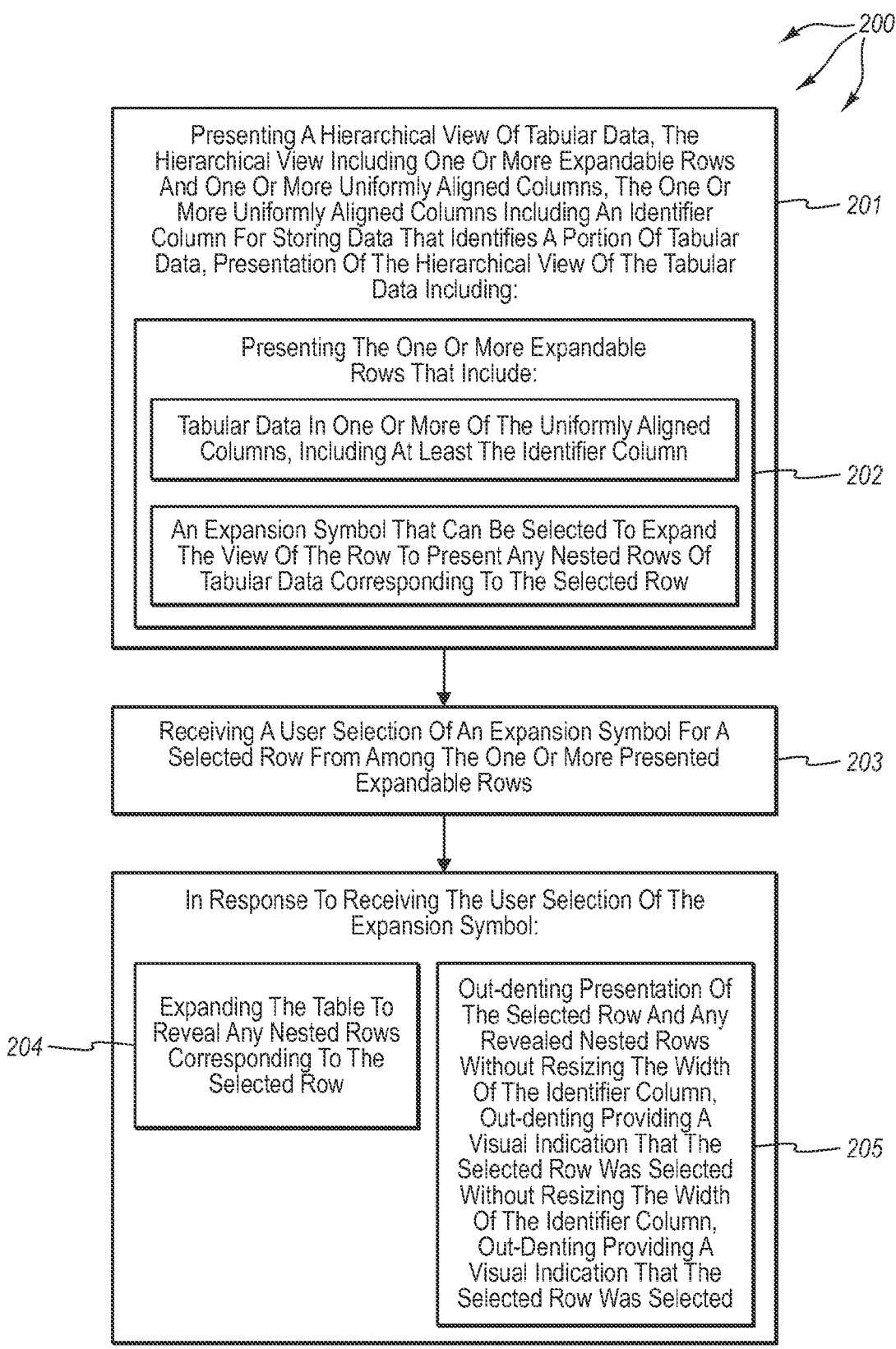
FIG. 2 illustrates a flow chart of an example method for hierarchically presenting tabular data.

FIG. 2 illustrates a flow chart of an example method for hierarchically presenting tabular data. Method 200 will be described with respect to the components and data depicted in computer architecture 100 and with respect to hierarchical view 300.

Method 200 includes an act of presenting a hierarchical view of tabular data, the hierarchical view including one or more expandable rows and one or more uniformly aligned columns, the one or more uniformly aligned columns including an identifier column for storing data that identifies a portion of tabular data (act 201). For example, user 113 can submit data request 134 to user-interface 101. User-interface 101 can determine that data request 134 is directed to presentation editor 102 and forward data request 134 to presentation editor 102. Presentation editor 102 can receive data request 134 and determine that data request 134 is a request for tabular data 106.

Presentation editor 102 can request and receive tabular data 106 from within tabular data 136 at storage 136. Presentation editor 102 can apply formatting rules 104 to tabular data 106 to generate presentation data 112. Presentation editor 102 can then send presentation data 112 to rendering module 107. Rendering module 107 can convert presentation data 112 (potentially adding visual cues) to visual data 141. Rendering module 107 can send visual data 141 to user interface 101. User interface 101 can determine that visual data 141 is to be rendered at display device 108. User interface 101 can send visual data 141 to display device 108. Display device 108 can render visual data 141 on display 109 as hierarchical view 300.

Presentation of the hierarchical view of the tabular data includes an act of presenting the one or more expandable rows (act 202). For example, referring to FIG. 3A, display device 108 can present expandable rows 301 and 302. Each expandable row includes tabular data in one or more of the uniformly aligned columns, including at least the identifier column. Each expandable row also includes an expansion symbol that can be selected to expand the view of the row to present any nested rows of tabular data corresponding to the selected row.

Each of rows 301 and 302 include tabular data in aligned columns 351, including columns 351A, 351B, 351C, and 351D. Column 351A includes a name or identifier used to identify a row. For example, "Par70670" can be used to identify row 301. Rows 301 and 302 also include corresponding expansion symbols 311 and 312 respectively. Expansion symbols 311 and 312 can be selected (e.g., with input devices 114) to present any nested rows of tabular data corresponding to rows 301 and 302 respectively. Presentation editor 102 can include expansion symbols in presentation data 112 or visual assist module 117 can supplement presentation data 112 to include expansion symbols.

Method 200 includes an act of receiving a user selection of an expansion symbol for a selected row from among the one or more expandable rows (act 203). For example, referring back to FIG. 1, user 113 can enter expansion symbol selection 133 at input devices 114. Referring again to FIG. 3A, user 113 can use input devices 114 to select expansion symbol 311 to cause expansion symbol selection 133 to occur. For example, user 113 can move cursor 391 over expansion symbol 311 and click a button on a mouse. User interface 101 can forward expansion symbol selection 133 to presentation editor 102 and/or rendering module 107.

In response to receiving the user selection of the expansion symbol, method 200 includes an act of expanding the selected row to reveal any nested rows corresponding to the selected row (act 204). For example, referring to FIG. 3B, in response to selection of expansion symbol 311, rendering module 107 can send expanded visual data 142 to display device 108. Expanded visual data 142 can include further data from tabular data 136 in the form presentation data supplementing presentation data 112. Alternately, presentation data 112 can include and/or be converted to expanded visual data 142 data along with visual data 141 in anticipation of subsequent expansion.

Expanded visual data 142 can expand hierarchical view 300 to present nested rows 303, including parent rows 313, 314, and 315. In response to receiving the user selection of the expansion symbol, method 200 also includes an act of out-denting presentation of the selected row and any revealed nested rows without resizing the width of the identifier column, out-denting providing a visual indication that the selected row was selected. For example, presentation of row 301 and nested rows 303 are out-dented into out-dention area 352 with out resizing column 351A. Out-dention area 352 provides a visual indication that row 301 was selected. Row 301 includes collapse symbol 341 that can be selected to return the presentation of hierarchical view 300 to that depicted in FIG. 3A. Dashed lines represent the boundaries of out-dention areas but are not necessarily included in the presentation of hierarchical view 300.

Some or all of method 200 can be repeatedly applied to view further nested rows within a table. For example, in FIG. 3B, expansion symbol 343 can be selected to expand row 313. In response to selection of expansion symbol 343, hierarchal view 300 can be further expanded to reveal nested rows 304. Also in response to selection of expansion symbol 343, presentation of row 313 and nested rows 304 are out-dented into out-dention area 353 with out resizing column 351A. Out-dention area 353 provides a visual indication that row 313 was selected. In response to adding out-dention area 353, out-dention area 352 is also further out-dented with out resizing column 351A. Row 313 includes a collapse symbol 342 that can be selected to return the presentation of hierarchical view 300 to that depicted in FIG. 3B.

In some embodiments, the visual footprint of out-denting is reduced or minimized to converse space. For example, in FIG. 3D the visual footprints of out-dention areas 352 and 353 are minimized. A reduced footprint can be applied in a number of different ways. For example, a reduced footprint can be the default. A user can hover or "mouse over" an out-dention area or far left each of hierarchical view 300 to increase the visual footprint of out-dention areas. Alternately, one or more user interface controls can be utilized to toggle between a reduced visual footprint and expanded visual foot print for out-dention areas.

Figure 3A:
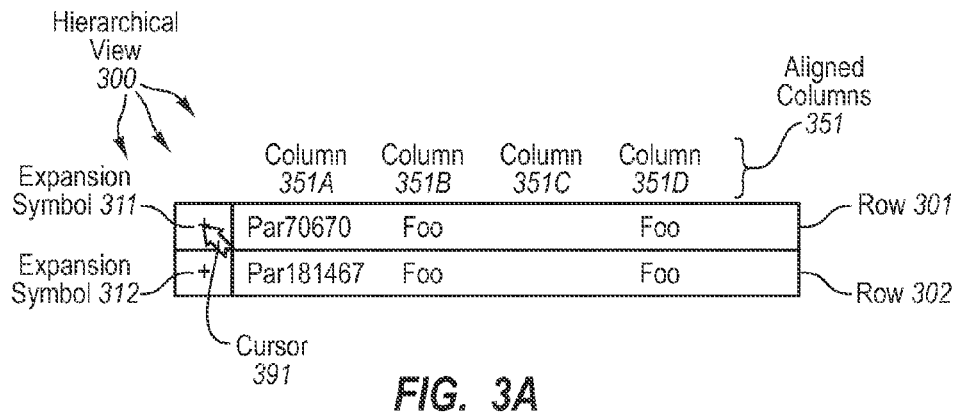
FIGS. 3A-3D illustrate an example table using out-denting with hierarchically presented data to preserve column alignment.
Figure 3B:
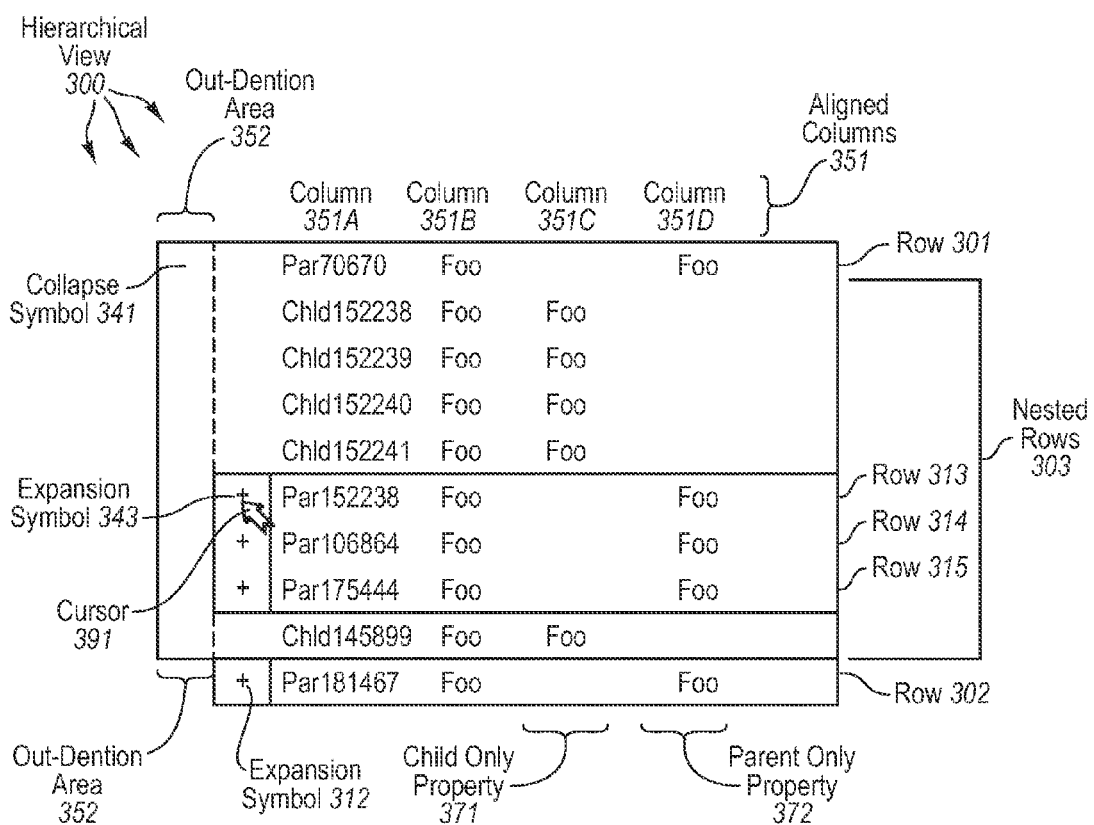
Figure 3C:
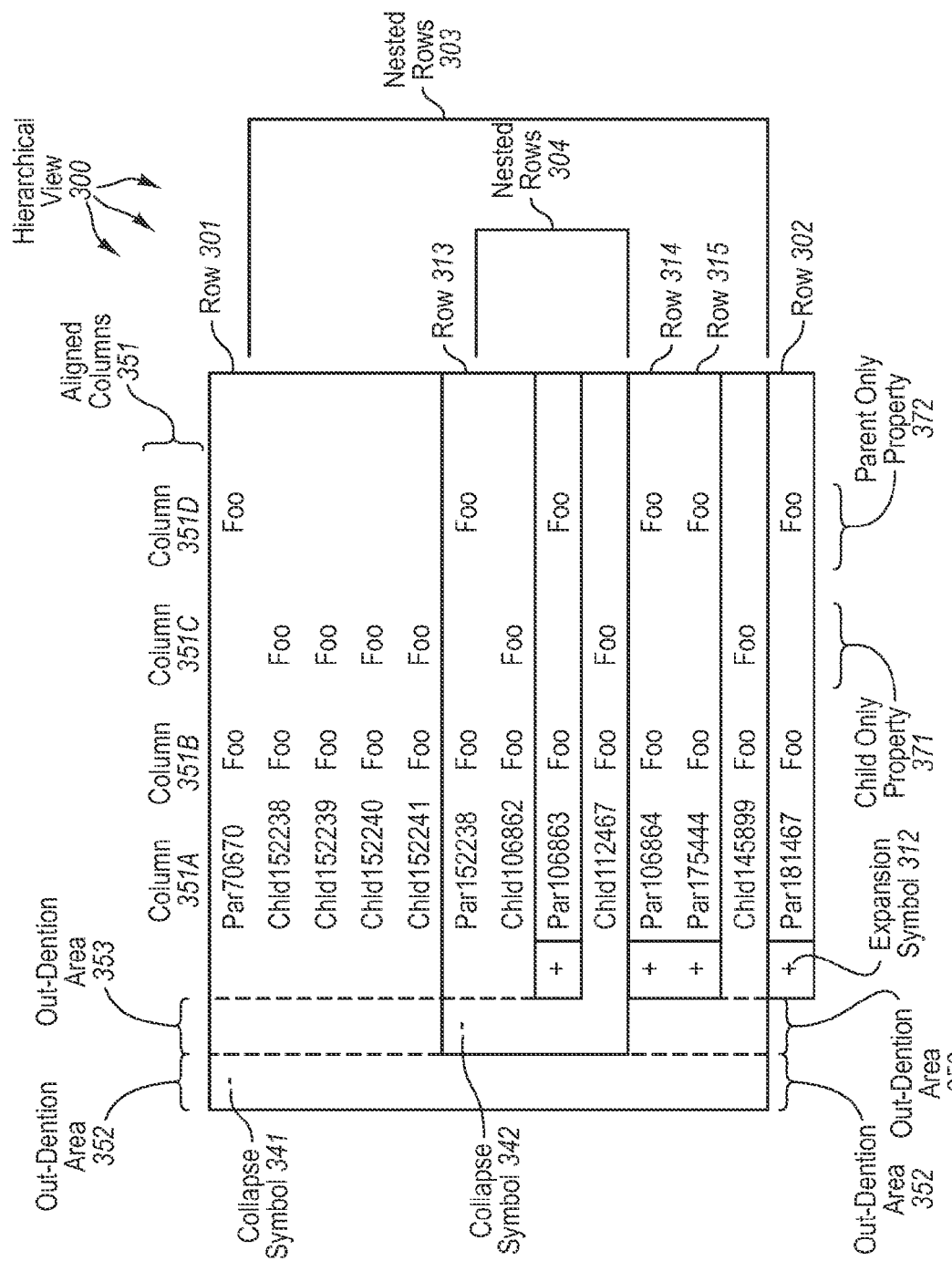
Figure 3D:
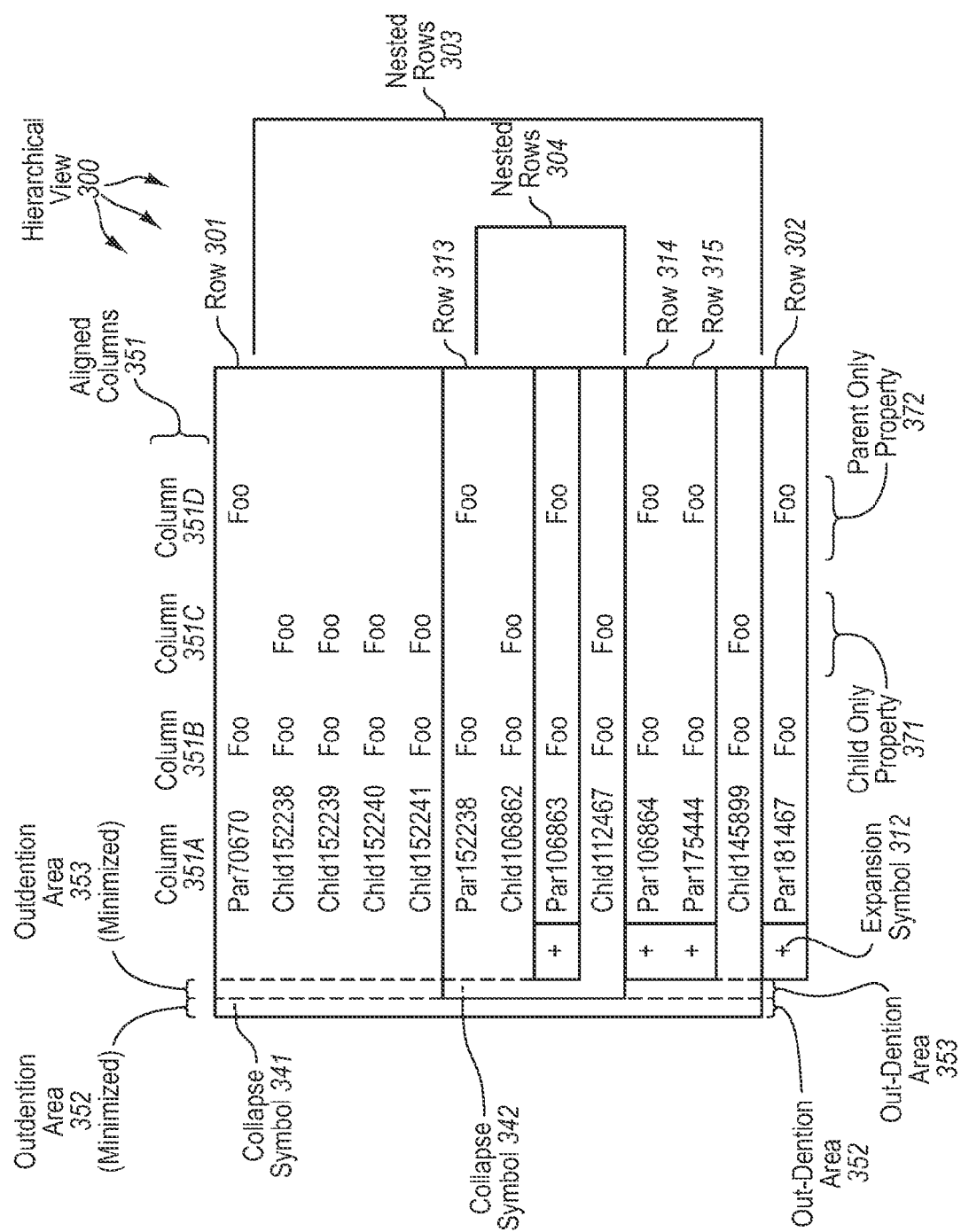

Embodiments of the invention can also account for irregular data without altering the arrangement of aligned columns 351. Irregular data can result, for example, when a parent has a property a child does not or when a child has a property a parent does not (and thus a parent and child contain data in different columns). For example, in FIGS. 3B, 3C, and 3D child only property 371 is presented in column 351C. On the other hand, parent only property 372 is presented in column 351D. In FIG. 3A, child only property 371 is accounted for with the inclusion of column 351C.

Figure 5A:
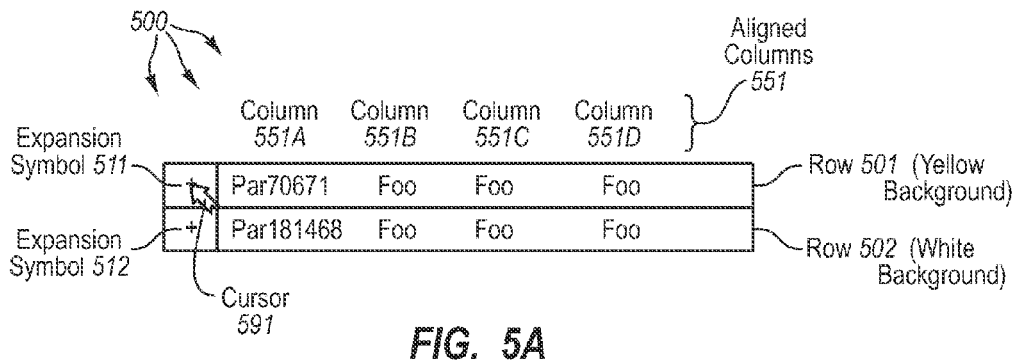
Figure 5B:
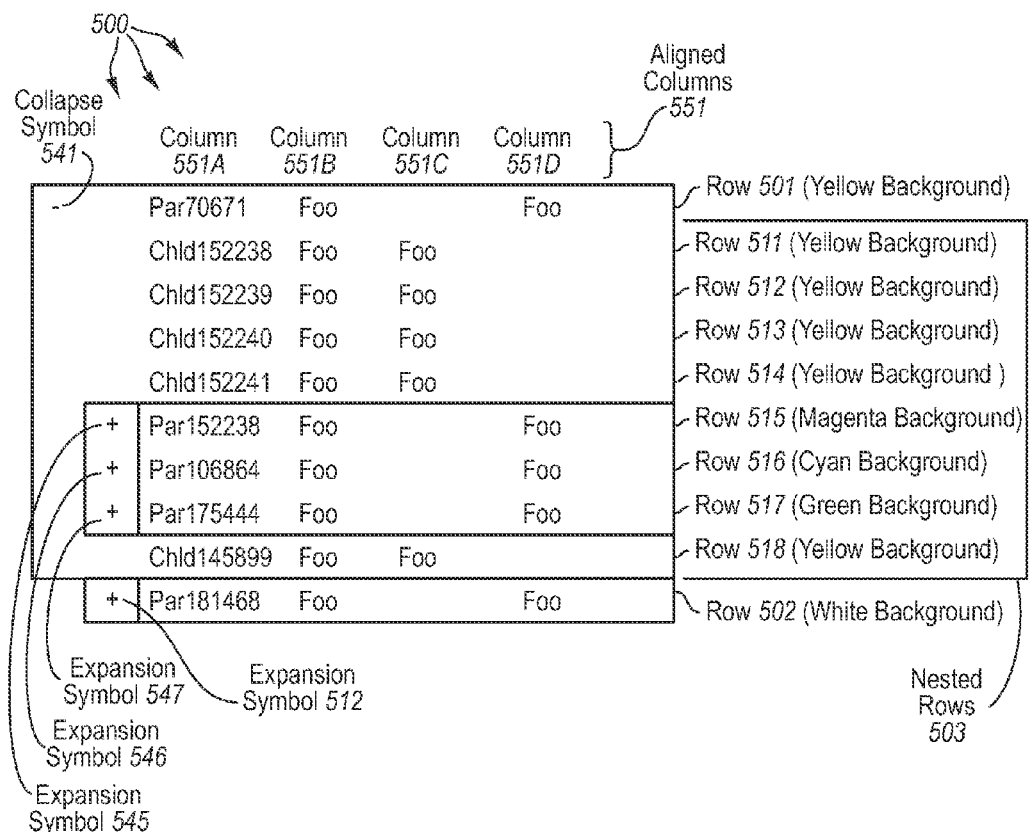
Figure 5C:
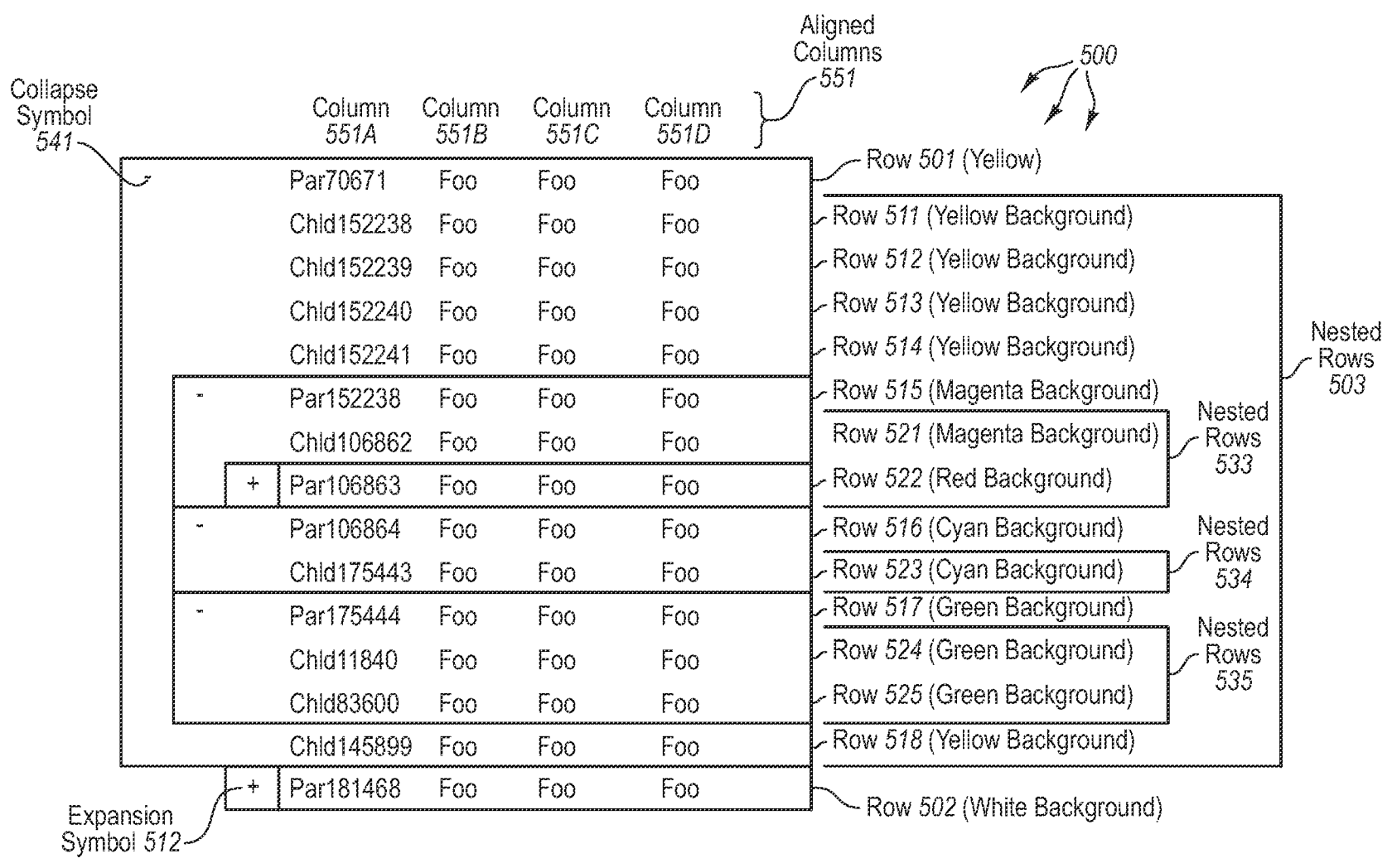

FIGS. 5A-5C illustrate an example hierarchical view 500 using color coding with out-denting to more easily distinguish rows from one another in hierarchically presented data.

Figure 4:
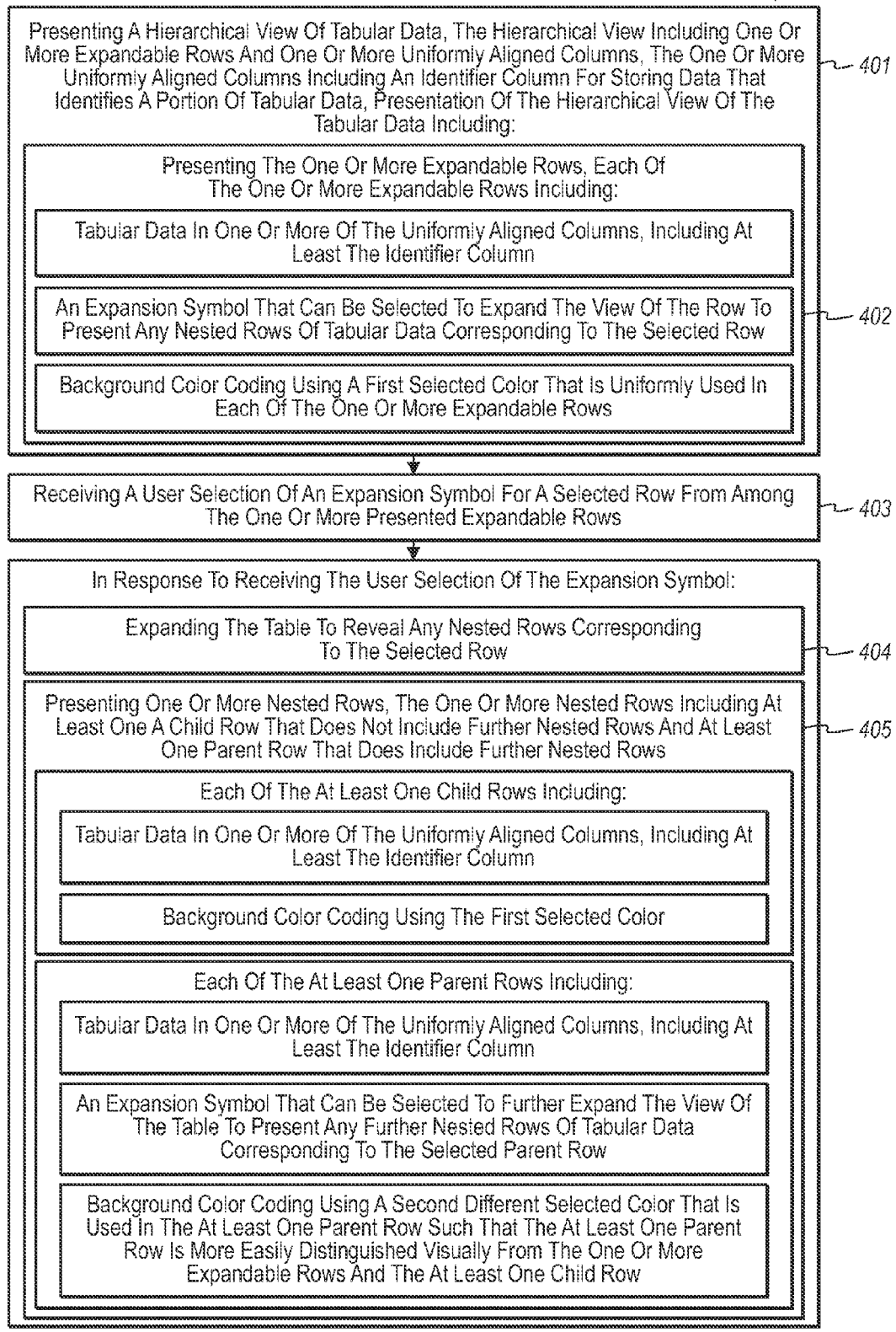
FIG. 4 illustrates a flow chart of another example method for hierarchically presenting tabular data.

FIG. 4 illustrates a flow chart of an example method for hierarchically presenting tabular data. Method 400 will be described with respect to the components and data depicted in computer architecture 100 and with respect to hierarchal view 500.

Method 400 includes an act of presenting a hierarchical view of tabular data, the hierarchical view including one or more expandable rows and one or more uniformly aligned columns, the one or more uniformly aligned columns including an identifier column for storing data that identifies a portion of tabular data (act 401). For example, rendering module 107 can convert presentation data (potentially adding visual cues) to corresponding visual data. Rendering module 107 can send the visual data to user interface 101. User interface 101 can determine that the visual data is to be rendered at display device 108. User interface 101 can send the visual data to display device 108. Display device 108 can render the visual data on display 109 as hierarchical view 500.

Presentation of the hierarchical view of the tabular data includes an act of presenting the one or more expandable rows (act 402). For example, referring to FIG. 5A, display device 108 can present expandable rows 501 and 502. Each of the one or more expandable rows includes tabular data in one or more of the uniformly aligned columns, including at least the identifier column. Each of the one or more expandable rows also includes an expansion symbol that can be selected to expand the view of the row to present any nested rows of tabular data corresponding to the selected row. Each of the one or more expandable rows are presented in a first selected background color that is uniformly used in each of the one or more expandable rows Each of rows 501 and 502 include tabular data in aligned columns 551, including columns 551A, 551B, 551C, and 551D. Column 551A includes a name or identifier used to identify a row. For example, "Par70671" can be used to identify row 501. Rows 501 and 502 also include corresponding expansion symbols 511 and 512 respectively. Expansion symbols 511 and 512 can be selected (e.g., with input devices 114) to present any nested rows of tabular data corresponding to rows 501 and 502 respectively. Presentation editor 102 can include expansion symbols in presentation data 112 or visual assist module 117 can supplement presentation data 112 to include expansion symbols.

Presentation editor 102 can also set the background color for rows 501 and 502 as yellow and white respectively or visual assist module 117 can supplement presentation data 112 to the background color for rows 501 and 502 to yellow and white respectively. Display device 108 can present rows 501 and 502 with yellow and white backgrounds respectively. For example, text or other data in row 501 can be in a text color (e.g., black) on a yellow background. Text or other data in row 502 can be in a text color (e.g., black) on a white background.

Method 400 includes an act of receiving a user selection of an expansion symbol for a selected row from among the one or more presented expandable rows (act 403). For example, user 113 can enter expansion symbol selection input at input devices 114. Referring again to FIG. 5A, user 113 can use input devices 114 to select expansion symbol 511 to enter expansion symbol selection input. For example, user 113 can move cursor 591 over expansion symbol 511 and click a button on a mouse. User interface 101 can forward expansion symbol selection input to presentation editor 102 and/or rendering module 107.

In response to receiving the user selection of the expansion symbol, method 400 includes an act of expanding the selected row to reveal any nested rows corresponding to the selected row (act 404). For example, referring to FIG. 5B, in response to selection of expansion symbol 511, rendering module 107 can send expanded visual data to display device 108. Expanded visual data can include further data from tabular data 136 in the form of supplemental presentation data. Alternately, originally sent presentation data can include and/or be converted to expanded visual data in anticipation of subsequent expansion.

In response to receiving the user selection of the expansion symbol, method 400 also include an act of presenting one or more nested rows, the one or more nested rows including at least one a child row that does not include further nested rows and at least one parent row that does include further nested rows (act 405). For example, in FIG. 4B, hierarchical view 400 is expanded to present nested rows 503, including rows 511-517. Rows 511, 512, 513, 514, and 518 are child rows that do not include further nested rows. Rows 515, 516, and 517 are parent rows that do include further nested rows.

Each of the at least one child rows includes tabular data in one or more of the uniformly aligned columns, including at least the identifier column. For example, rows 511, 512, 513, 514, and 518 include data in columns 551A, 551B, and 551C. Each of the at least one child rows is background color coded using a first selected color. For example, display device 108 can present rows 511, 512, 513, 514, and 518 with a yellow background. Thus, text or other data in rows 511, 512, 513, 514, and 518 can be in a text color (e.g., black) on a yellow background. The yellow background provides a visual indication that rows 511, 512, 513, 514, and 518 are child rows of row 501. Using the same background color for a parent row and child rows a user can more easily visualize the association between the rows.

Each of the at least one parent rows includes tabular data in one or more of the uniformly aligned columns, including at least the identifier column. For example, rows 515, 516, and 517 include data in columns 551A, 551B, and 551D. Each of the at least one parent rows also includes an expansion symbol that can be selected to further expand the view of the table to present any further nested rows of tabular data corresponding to the selected parent row. For example, rows 515, 516, and 517 include expansion symbols 545, 546, and 547 respectively that can be selected. Selection of expansion symbols 545, 546, and 547 can further expand hierarchical view 500 to present nested rows of tabular data corresponding to rows 515, 516, and 517 respectively.

Each of the at least one parent rows is background color coded using a second different selected color that is used in the at least one parent. For example, display device 108 can present row 515 with a magenta background. Thus, text or other data in rows 515 can be in a text color (e.g., black or white) on a magenta background. Using a different background color the at least one parent row is more easily distinguished visually from the one or more expandable rows and the at least one child row. For example, using magenta as the background color for row 515 a user can more easily distinguish row 515 from row 501, rows 511-514 and 518, row 516 (having a cyan background color), row 517 (having a green background color), and row 502 (having a white background). Cyan and Green can be used as background colors for rows 516 and 517 respectively. Thus, rows 516 and 517 are also more easily distinguished from row 501, rows 511-514 and 518, row 515, row 502, and from one another.

Generally, when utilizing background color coding, visual assist module 117 can formulate color coding data based on the number of and relative position of parent and child rows that are to be displayed. Visual assist module 117 can include color coding data in (expanded) visual data that is sent to display device 108 for presentation. For example, visual assist module 117 can include color coding data 143 in visual data 141 (and later in expanded visual data 142). Color coding data 143 can indicate, for example, how background colors for rows of hierarchical view 600 are to be color coded. When the number and/or relative position of parent and/or child rows changes, visual assist module can correspondingly re-code background colors to provide a better visual experience.

Colors for text or other objects on a row can be adjusted for visibility based on the selected background color. For example, on a lighter colored background color (e.g., cyan) a darker color (e.g., black) can be used for text and other objects. On the other hand, on a darker color background (e.g., purple) a light color (e.g., white) can be used for text and other objects. However, embodiments also include retaining a consistent text color across all rows independent of background colors.

Some or all of method 400 can be repeatedly applied to further color code rows of hierarchical view 500. For example, in FIG. 5B, any of expansion symbols 545, 546, and 547 can be selected to expand rows 515, 516, and 517 respectively. Turning now to FIG. 5C, child rows can be presented in the same background color as their parent row. Further parent rows can be presented using different background colors (or reusing other background colors that at least differ from other rows in the immediate vicinity). For example, expansion symbol 545 can be selected to reveal nested rows 533. Child row 521 is presented with a magenta background color (the same as row 515). Parent row 522 is presented with a red background color.

Expansion symbol 546 can be selected to reveal nested rows 534. Child row 523 is presented with a cyan background color (the same as row 516). Expansion symbol 546 can be selected to reveal nested rows 535. Child rows 524 and 525 are presented with a green background color (the same as row 517).

As depicted, FIGS. 5A-5C utilize out-denting in combination with background color coding. However, background color coding can be used alone or combination with virtually any other organization mechanism to assist a user in distinguishing between different portions of tabular data. For example, FIGS. 6A-6B illustrate an example table 600 using color coding with indenting to more easily distinguish rows from one another in hierarchically presented data. Table 600 includes rows 601, 602, and 603 having background colors of cyan, white, and red respectively. Upon selection of row 601 with cursor 691, table 600 can be expanded to include rows 611 and 612. Rows 611 and 612 use background colors of peach and magenta respectively such that rows 611 and 612 are more easily distinguished from one another and the other rows of table 600. Although not depicted, child rows can be displayed using the same background color as their corresponding parent row.

Embodiments of the invention can also facilitate background color coding of nested tables to visually assist in distinguishing between rows within nested tables.

Figure 8:
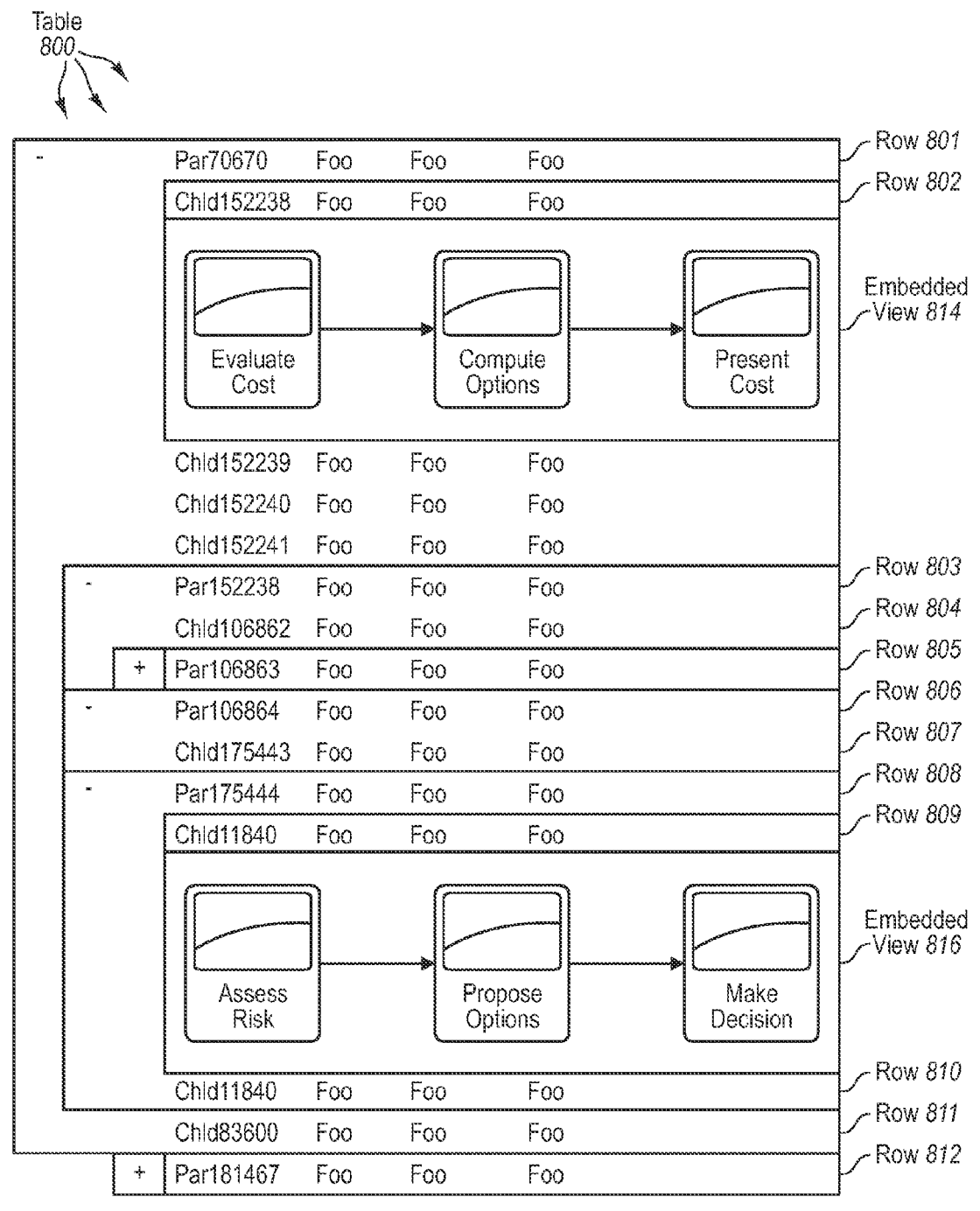

Embodiments of the invention also facilitate embedding rich views alongside standard row views. FIG. 7 illustrates an example of a table 700 including embedded rich views along with row views in a table. As depicted, table 700 includes rows 701-711 along with embedded views 714 and 716 of property sheets. The use of out-denting permits better user experiences, for example, compared in indenting, when tables include a combination of rows and other rich views. FIG. 8 illustrates an example of a table 800 including other embedded view combinations along with row views in a table. As depicted, table 800 includes rows 801-812 along with embedded views 814 and 816 of diagrams.

Accordingly, embodiments of the invention utilize out-denting and/or color coding to organize and present tabular data to a user so that comparisons across multiple levels of data are possible while maintaining hierarchical organization of a model. That is, the columnar structure of tables can be maintained to allow rich cross-column comparison within various levels of nesting. Further, scaling is significantly increased since nesting has a reduced (and potentially no) impact on column alignment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for hierarchically presenting tabular data, the method comprising:
   an act of presenting a hierarchical view of tabular data, the hierarchical view including one or more expandable rows and one or more uniformly aligned columns, the one or more uniformly aligned columns including an identifier column for storing data that identifies a portion of tabular data, presentation of the hierarchical view of the tabular data including:
   an act of presenting the one or more expandable rows in a table that includes:
   tabular data in one or more of the uniformly aligned columns, including at least the identifier column; and
   an expansion symbol that can be selected to expand the view of the row to present any nested rows of tabular data corresponding to the selected row;
   an act of receiving a user selection of an expansion symbol for a selected row from among the one or more presented expandable rows; and
   in response to receiving the user selection of the expansion symbol:
   an act of expanding the table to reveal any nested rows corresponding to the selected row; and
   an act of out-denting presentation of the selected row and any revealed nested rows without resizing the width of the identifier column and by at least generating an out-dention area for the selected row and corresponding revealed nested rows, the out-denting providing a visual indication that the selected row was selected.

2. The method as recited in claim 1, wherein an act of presenting a hierarchical view of tabular data comprises an act of presented data from one of a spreadsheet and a database.

3. The method as recited in claim 1, wherein the act of presenting a hierarchical view of tabular data, the hierarchical view including one or more expandable rows and one or more uniformly aligned columns comprises an act presenting one or more expandable parent rows and one or more non-expandable child rows.

4. The method as recited in claim 3, wherein an act presenting one or more expandable parent rows and one or more non-expandable child rows comprises:
   an act of presenting data in at least one uniformly aligned column within expandable parent rows but not within non-expandable child rows; and
   an act of presenting data in at least one uniformly aligned column within non-expandable child rows but not within expandable parent rows.

5. The method as recited in claim 1, wherein the act of presenting a hierarchical view of tabular data, the hierarchical view including one or more expandable rows and one or more uniformly aligned columns comprises an act of background color coding the one or more expanding rows with a variety of different background colors to assist in visually distinguishing the one or more expandable rows from one another.

6. The method as recited in claim 5, wherein the act of expanding the table to reveal any nested rows corresponding to the selected row comprises an act of color coding one or more nested child rows of the selected row with the same background color as the selected row.

7. The method as recited in claim 1, wherein the act of expanding the table to reveal any nested rows corresponding to the selected row comprises an act of revealing a nested row that includes an embedded view of data in a format selected from among: a property sheet and a diagram.

8. The method as recited in claim 1, wherein the act of expanding the table to reveal any nested rows corresponding to the selected row comprises an act expanding the table to review further expandable parent rows, the further expandable parent rows including:
   tabular data in one or more of the uniformly aligned columns, including at least the identifier column; and
   an expansion symbol that can be selected to expand the view of the further expandable parent row to present any nested rows of tabular data corresponding to the selected further expandable parent row.

9. The method as recited in claim 8, further comprising:
   an act of receiving a user selection of an expansion symbol for a selected further expandable parent row; and
   in response to receiving the user selection of the expansion symbol:
   an act of expanding the table to reveal any nested rows corresponding to the selected further expandable parent row; and
   an act of out-denting presentation of the selected further expandable parent row and any revealed nested rows without resizing the width of the identifier column, out-denting providing a visual indication that the selected row was selected.

10. The method as recited in claim 9, further comprising:
   an act of further out-denting presentation of the selected row and any revealed nested rows to extend past the out-dention of selected further expandable row without resizing the width of the identifier column.

11. The method as recited in claim 1, further comprising:
an act of minimizing the out-dention of the selected row and any revealed nested rows to reduce the footprint of the out-dention.

12. At a computer system, a method for hierarchically presenting tabular data, the method comprising:
an act of presenting a hierarchical view of tabular data, the hierarchical view including one or more expandable rows and one or more uniformly aligned columns, the one or more uniformly aligned columns including an identifier column for storing data that identifies a portion of tabular data, presentation of the hierarchical view of the tabular data including:
an act of presenting the one or more expandable rows in a table, each of the one or more expandable rows including:
tabular data in one or more of the uniformly aligned columns, including at least the identifier column;
an expansion symbol that can be selected to expand the view of the row to present any nested rows of tabular data corresponding to the selected row; and
background color coding using a first selected color that is uniformly used in each of the one or more expandable rows;
an act of receiving a user selection of an expansion symbol for a selected row from among the one or more presented expandable rows; and
in response to receiving the user selection of the expansion symbol:
an act of expanding the table to reveal any nested rows corresponding to the selected row;
an act of presenting one or more nested rows, the one or more nested rows including at least one a child row that does not include further nested rows and at least one parent row that does include further nested rows,
each of the at least one child rows including:
tabular data in one or more of the uniformly aligned columns, including at least the identifier column; and
background color coding using the first selected color; and;
each of the at least one parent rows including:
tabular data in one or more of the uniformly aligned columns, including at least the identifier column;
an expansion symbol that can be selected to further expand the view of the table to present any further nested rows of tabular data corresponding to the selected parent row; and
background color coding using a second different selected color that is uniformly used in the at least one parent row such that the at least one parent row is more easily distinguished visually from the one or more expandable rows and the at least one child row.

13. The method as recited in claim 12, further comprising in response to receiving the user selection of the expansion symbol:
an act of out-denting presentation of the selected row and any revealed nested rows without resizing the width of the identifier column.

14. The method as recited in claim 12, further comprising in response to receiving the user selection of the expansion symbol:
an act of indenting presentation of the selected row and any revealed nested rows.

15. The method as recited in claim 12, further comprising in response to receiving the user selection of the expansion symbol:
an act of including at least one nested table within the table, the nested table including one or more child rows of the selected row.

16. The method as recited in claim 12, wherein the act of expanding the table to reveal any nested rows corresponding to the selected row comprises an act of revealing a nested row that includes an embedded view of data in a format selected from among: a property sheet and a diagram.

17. The method as recited in claim 12, wherein the act of expanding the table to reveal any nested rows corresponding to the selected row comprises
an act of presenting data in at least one uniformly aligned column within a parent nested rows but not within child nested rows; and
an act of presenting data in at least one uniformly aligned column within child nested rows but not within parent nested rows.

18. A system for hierarchical presentation of tabular data, the system comprising:
one or more processors;
system memory;
one or more physical storage media having stored thereon computer-executable instructions that, when executed at the one or more processors causes the computer system to:
present a hierarchical view of tabular data, the hierarchical view including one or more expandable rows and one or more uniformly aligned columns, the one or more uniformly aligned columns including an identifier column for storing data that identifies a portion of tabular data, presentation of the hierarchical view of the tabular data including:
presenting the one or more expandable rows in a table, each of the one or more expandable rows including:
tabular data in one or more of the uniformly aligned columns, including at least the identifier column;
an expansion symbol that can be selected to expand the view of the row to present any nested rows of tabular data corresponding to the selected row; and
background color coding using a first selected color that is uniformly used in each of the one or more expandable rows;
receive a user selection of an expansion symbol for a selected row from among the one or more presented expandable rows; and
in response to receiving the user selection of the expansion symbol:
expand the table to reveal any nested rows corresponding to the selected row;
generating an out-dention area in the table for the selected row and any revealed nested rows without resizing the width of the identifier column, out-denting providing a visual indication that the selected row was selected; and
present one or more nested rows, the one or more nested rows including at least one a child row that does not include further nested rows and at least one parent row that does include further nested rows,
each of the at least one child rows including:
tabular data in one or more of the uniformly aligned columns, including at least the identifier column; and
background color coding using the first selected color; and;
each of the at least one parent rows including:
tabular data in one or more of the uniformly aligned columns, including at least the identifier column;

an expansion symbol that can be selected to further expand the view of the table to present any further nested rows of tabular data corresponding to the selected parent row; and background color coding using a second different selected color that is uniformly used in the at least one parent row such that the at least one parent row is more easily distinguished visually from the one or more expandable rows and the at least one child row.

19. The method as recited in claim 18, wherein computer-executable instructions that, when executed, cause the computer system to expand the table to reveal any nested rows corresponding to the selected row comprise-executable instructions that, when executed, cause the computer system to:

presenting data in at least one uniformly aligned column within a parent nested rows but not within child nested rows; and present data in at least one uniformly aligned column within child nested rows but not within parent nested rows.

20. The method as recited in claim 18, wherein computer-executable instructions that, when executed, cause the computer system to expand the table to reveal any nested rows corresponding to the selected row comprise-executable instructions that, when executed, cause the computer system to reveal a nested row that includes an embedded view of data in a format selected from among: a property sheet and a diagram.

* * * * *